Jan. 8, 1946.   J. B. MILLER   2,392,605
METHOD OF PREPARING ZIRCONIUM OXIDE
Filed Aug. 15, 1941
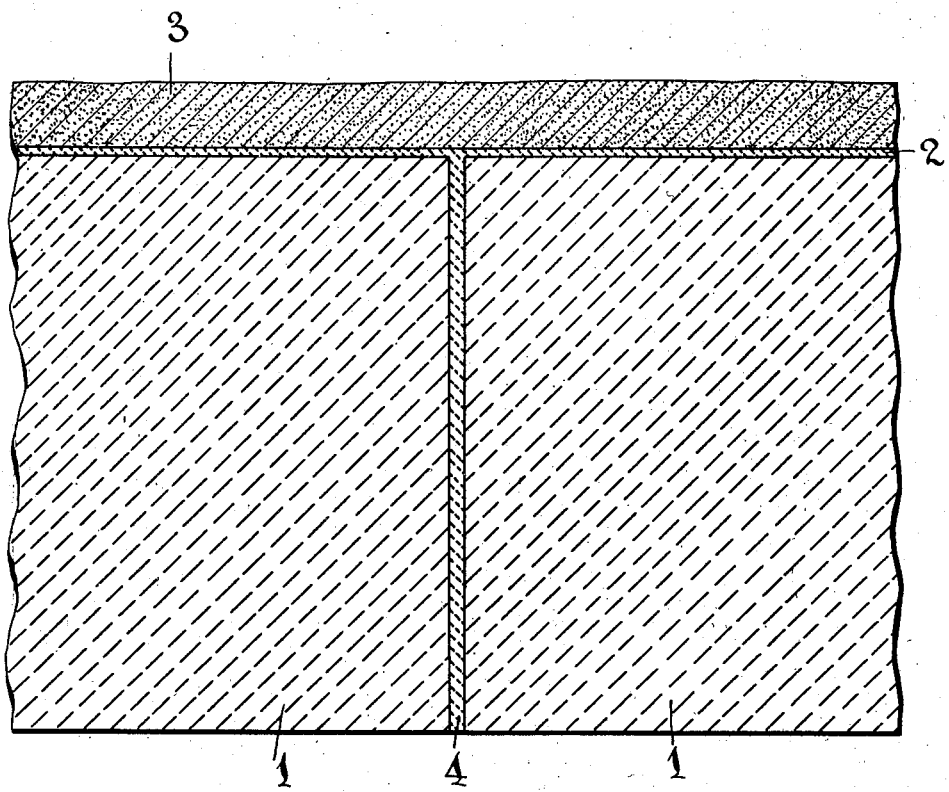
INVENTOR
John B. Miller,
BY
Beau, Brooks, Buckley & Beau.
ATTORNEYS Patented Jan. 8, 1946

2,392,605

UNITED STATES PATENT OFFICE 2,392,605

METHOD OF PREPARING ZIRCONIUM OXIDE

John B. Miller, Niagara Falls, N. Y., assignor to The Titanium Alloy Manufacturing Company, New York, N. Y., a corporation of Maine Application August 15, 1941, Serial No. 407,037

3 Claims. (Cl. 23—24.1)

This invention relates to a method for the preparation of zirconium oxide from zirconium-carbon-oxygen compounds.

A particularly useful method of manufacturing zirconium oxide is by heating a zirconium ore, such as baddeleyite or zircon, mixed with carbon in an electric resistance furnace, and then converting the resulting zirconium-carbon-oxygen compounds to zirconium oxide by heating or burning. Such methods are covered, in part, by U. S. Patents Nos. 2,110,733, 2,143,013, Reissue 21,726 and 2,194,426. In converting the zirconium-carbon-oxygen intermediates to zirconium oxide, one of the methods employed has been to spread the intermediate in a layer 6 to 8 inches thick and then to ignite. In this method, because of the low thermal conductivity of the fine zirconium oxide formed on top, the temperature underneath reaches a point at which the zirconium oxide shrinks to a denser form and loses many of its desirable properties, particularly as an opacifier for vitreous enamels. This is partially overcome by skimming the zirconium oxide away from the top at frequent intervals, but this requires excessive labor and does not entirely eliminate the overheating and the resultant change in the physical properties of the oxide. Another way to overcome this difficulty is by burning in thin layers. This method, however, is quite expensive as hitherto employed, inasmuch as it requires the continuous application of external heat, and thus not only consumes fuel but also requires a furnace or heating apparatus of relatively large size and high cost, in order to maintain the required high temperature without allowing the temperature to rise so high as to encounter the harmful shrinkage noted above.

It is therefore an object of this invention to provide a new method for converting zirconium-carbon-oxygen intermediates into zirconium oxide, without the disadvantages noted above. Other objects will appear hereinafter.

These objects are accomplished by spreading the zirconium-carbon-oxygen intermediate in a thin layer on a hearth or support composed of a heat insulating refractory material and provided with an extremely thin surface layer of dense refractory material which may be of low heat insulating value, igniting this layer at a plurality of selected points by scattering small portions of already burning intermediate thereon, and then allowing to completely burn without the further external application of heat.

A suitable insulating refractory material is insulating fire brick. This is a light-weight porous material principally made out of fire-clay or other aluminum silicate material, and having a specific gravity varying from about 0.3 to 1.0, and in some cases as high as 1.5. Ordinary fire-brick is not suitable for this purpose, since its porosity and therefore insulating value is not sufficient to maintain the required amount of heat in the burning mass. Accordingly, materials of high porosity must be used. In actual practice, the limit of porosity is determined by the strength requirements of the material and by the temperature which it must withstand in use. A suitable material is Armstrong's Insulating Fire Brick No. A-23, having a specific gravity of about 0.75 and capable of withstanding temperatures of 2300° F.

Other porous refractory materials are also suitable, provided the heat conductivity is sufficiently low. Thus, porous refractory materials made of zircon or zirconia are unsatisfactory because, although their porosity may be sufficient, zircon and zirconia are materials of inherently higher heat conductivity than fire-clay, so that again they are unable to maintain the required degree of heat in the burning mass.

The surface of the insulating refractory should be made dense, smooth and hard by the application of a suitable refractory cement. Those sold by the Armstrong Cork Company are suitable for this purpose. The layer should not exceed ¼ inch in thickness and preferably should be less than ⅛ inch thick. In this case, because of the thinness of the layer, materials of higher conductivity do not appreciably affect the insulating value of the refractory base. Thus zircon or zirconia cements, particularly the former, may be used to advantage. The application of a hard smooth surface is necessary for several reasons. The roughness of surface of the untreated porous refractories prevents clean and thorough removal of the zirconium-carbon-oxygen intermediate after it has been completely burned to zirconium oxide. Furthermore, due to the somewhat fragile nature of the porous insulating refractory, the process of removing the zirconium oxide would tend to break off small pieces of fire brick, which is undesirable both because it shortens the life of the fire brick and also because it contaminates the otherwise highly pure zirconium oxide product.

In the practice of the invention, the zirconium-carbon-oxygen intermediate is spread in a thin layer less than one inch thick, such as approximately one-half inch in thickness, on a hearth of the above described construction. Combustion is then initiated by scattering over the intermediate at suitably spaced intervals small amounts of already burning material. This burning material is most desirably the same zirconium-carbon-oxygen intermediate as is being treated on the hearth. Once combustion has been started, it quickly spreads throughout the entire mass, and proceeds until all the intermediate has been converted to zirconium oxide having highly desirable physical properties, and suitable as an opacifier for vitreous enamels and for other purposes.

The drawing shows a fragmentary cross sectional elevation of a hearth with material to be burned thereon, in accordance with this invention. 1 indicates the porous insulating refractory material, 2 the dense, smooth, hard facing applied thereto, and 3 the zirconium-carbon-oxygen intermediate. In the drawing, the facing 2 is indicated as made of the same material as the cement 4 used as a binder between adjacent bricks. It is understood, of course, that the cement 4 may if desired be a different material than the facing 2.

By the practice of this invention, it is made possible to make zirconium oxide of a high degree of purity and of suitable physical characteristics, with much lesser expenditure of fuel and labor than hitherto required.

As many variations are possible within the scope of this invention, it is not intended to be limited except as defined by the appended claims.

What is claimed is:

1. The method of making zirconium oxide for use as an opacifier from zirconium-carbon-oxygen intermediates, which comprises spreading said intermediate in a relatively thin layer on the order of one-half inch in thickness on a hearth composed of a heat insulating porous refractory material, provided with a smooth, hard, dense, thin surface layer of refractory material, igniting said intermediate at spaced points, and then allowing said intermediate to completely burn to zirconium oxide without the further external application of heat.

2. The method of making zirconium oxide for use as an opacifier from zirconium-carbon-oxygen intermediates, which comprises spreading said intermediate in a relatively thin layer on the order of one-half inch in thickness on a hearth composed of a heat insulating porous refractory aluminum silicate having a density of less than 1.5, provided with a smooth, hard, dense, thin surface layer of refractory material, igniting said intermediate at spaced points, and then allowing said intermediate to completely burn to zirconium oxide without the further external application of heat.

3. The method of making zirconium oxide for use as an opacifier from zirconium-carbon-oxygen intermediates, which comprises spreading said intermediate in a layer more than one-half inch but less than one inch thick on a hearth composed of a heat insulating porous refractory aluminum silicate having a density of 0.3 to 1.0, provided with a smooth, hard, dense, surface layer less than 0.25 inch thick of refractory material, igniting said intermediate at spaced points, and then allowing said intermediate to completely burn to zirconium oxide without the further external application of heat.

JOHN B. MILLER.